United States Patent
Wilson

[11] Patent Number: 6,092,476
[45] Date of Patent: Jul. 25, 2000

[54] HOPPER FOR SEEDING MACHINE

[75] Inventor: Sylvia Ann Wilson, Moline, Ill.

[73] Assignee: Deere & Company, Moline, Ill.

[21] Appl. No.: 09/441,247

[22] Filed: Nov. 16, 1999

[51] Int. Cl.[7] .................................................... B65D 43/16
[52] U.S. Cl. ......................................... 111/200; 220/812
[58] Field of Search ................................. 111/63, 74, 75,
111/925, 200; 222/528, 529, 530, 531,
533, 534, 535, 522, 608; 220/812, 811

[56] References Cited

U.S. PATENT DOCUMENTS

| | | | |
|---|---|---|---|
| 1,737,411 | 11/1929 | Deans | 220/812 |
| 3,995,764 | 12/1976 | Zagami | 220/812 |
| 4,119,240 | 10/1978 | Dumas et al. | 220/812 |
| 4,396,119 | 8/1983 | Giulie | 220/812 |
| 4,821,902 | 4/1989 | May | 220/812 |
| 4,848,618 | 7/1989 | Yuan et al. | 220/812 |
| 5,085,341 | 2/1992 | Hodge | 220/331 |
| 5,203,664 | 4/1993 | Jensen | 220/812 |
| 5,251,775 | 10/1993 | Krvzick et al. | 220/812 |
| 5,287,984 | 2/1994 | Michael | 220/812 |
| 5,353,947 | 10/1994 | Zinnbauer et al. | 220/812 |

OTHER PUBLICATIONS

Deere & Company Operator's Manual entitled "7200 4–Row and 6–Row MaxEmerge 2 Drawn Planters Operator's Manual", cover and pages 60–8 thru 60–11, printed in the U.S.A., May 1988.

Advertising brochure entitled "Planter Attachments and Accessories", cover and p. 20, printed in the U.S.A., date unknown.

Advertising brochure entitled "MaxEmerge Plus Planters", cover and p. 23, printed in the U.S.A., date unknown.

Advertising brochure entitled "New Idea 9000 Air Series Planters", cover and selected unnumbered pages, printed in the U.S.A., 1990.

Advertising brochure entitled "White 6000 Series Planters", cover and pp. 4–5, and p. 11, printed in the U.S.A., 1992.

*Primary Examiner*—Christopher J. Novosad

[57] ABSTRACT

A seed hopper for a seeding machine is provided with a plastic bin having a substantially horizontal open top that is enclosed by a plastic lid. The bin has two sidewalls having a track extending the length of the bin. The lid is provided with two inwardly extending pins that engage the track. The lid has forward closed position and a rear fully opened position. In moving the lid from a forward closed position to a rear fully opened position the pins slide along the track. At the rear fully opened position the lid can be pivoted on the pins so that it assumes a opened vertical holding position. The lid and bin are provided with cooperating latching structures for latching the lid in its forward closed position.

17 Claims, 5 Drawing Sheets

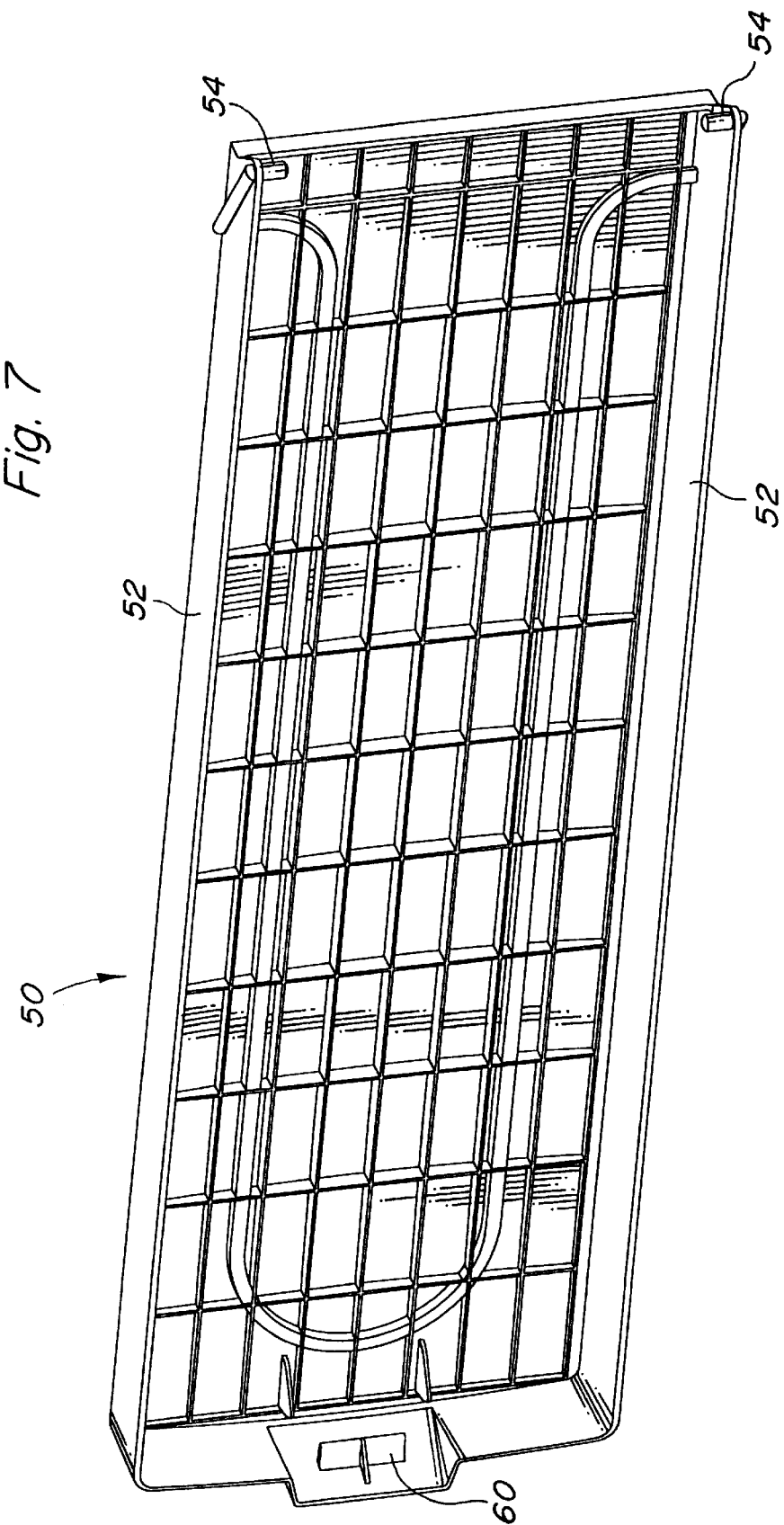

HOPPER FOR SEEDING MACHINE

BACKGROUND OF THE INVENTION

1. Field of the Invention

The present invention is directed to a hopper having a bin and lid in which the lid can be slid horizontally into a fully opened position and then pivoted vertically into a holding position.

2. Description of the Prior Art

Agricultural seeding machines such as row crop planters are provided with hoppers for holding seed, fertilizer or pesticides. These hoppers typically comprise plastic bins having a front wall, a rear wall, two side walls, an open top and a bottom wall having an outlet opening. The open top is closed by a detachable lid which may also be made of plastic. The lid and bin have a latching assembly for latching the lid to the bin when the lid is in its fully closed position. To load the bin, the lid is removed and seed or other product is poured into the bin through the open top. The lid may be provided with a hook so it can be mounted to the side of the hopper after it has been removed. The hook allows the lid to hang down vertically from the side of the hopper. This arrangement has not always proved satisfactory as the lids may blow away by wind gusts and depending how the farmer hangs the lids they may obstruct access to the neighboring bins.

In one currently marketed row crop planter the lids slide fore and aft along a track formed in the bin. With this design, when the lids are in their fully opened position, the lids extend horizontally rearward behind the bins obstructing the farmer's access to the respective bin and neighboring bins.

SUMMARY

It is an object of the present invention to provide a hopper having a lid that is not detached from the bin in its fully opened position and the lid in its fully opened position can be placed in a holding position that does not obstruct a farmers access to the bin.

It is a feature of the present invention that the lid of the bin is mounted to a track on the bin, so that the lid can slide rearwardly from its closed position into its fully opened position, and then can pivot vertically into its holding position below the top edge of the bin.

A hopper for a seeding machine is provided with a plastic bin having a substantially horizontal open top that is enclosed by a plastic lid. The bin has a front wall, a rear wall and left and right side walls. A track is formed on the left and right sidewalls extending between the front wall and the rear wall. The lid is provided with two inwardly extending pins that engage the track. The lid has a forward closed position and a rear fully opened position. In moving the lid from its forward closed position to its rear fully opened position, the pins slide along the track. At the rear fully opened position, the lid can be pivoted vertically on the pins so that it assumes a vertical holding position. The lid and bin are provided with cooperating latching structures for latching the lid in its forward closed position.

The track comprises a channel formed in the bin adjacent to the top edge. The forward portion of the track is depressed so that the lid tracks downwardly as it slides forward from an opened position to its forward fully closed position. In addition, the forward portion of the track is provided with two openings by which the pins of the lid can be disengaged from the track and the lid removed from the bin.

The lid is provided with an overlapping rim that overlies the top edge and extends downwardly therefrom outside the bin. The cooperating latching structure on the lid comprises a hook that engages a catch located on the bin. When the lid is moved from an opened position to a closed position the lid slides forward on the pins located in the tracks. As the pins approach the forward portion of the tracks, the lid moves downwardly as it encounters the depressed portion of the track. The hook of the lid engages the catch on the bin and the lid is latched to the bin. The downward movement of the lid allows the overlapping rim to better cover the top edge and better protect the product located in the bin.

BRIEF DESCRIPTION OF THE DRAWINGS

FIG. 7 is a bottom view of the lid.

DETAILED DESCRIPTION

Figure 1:
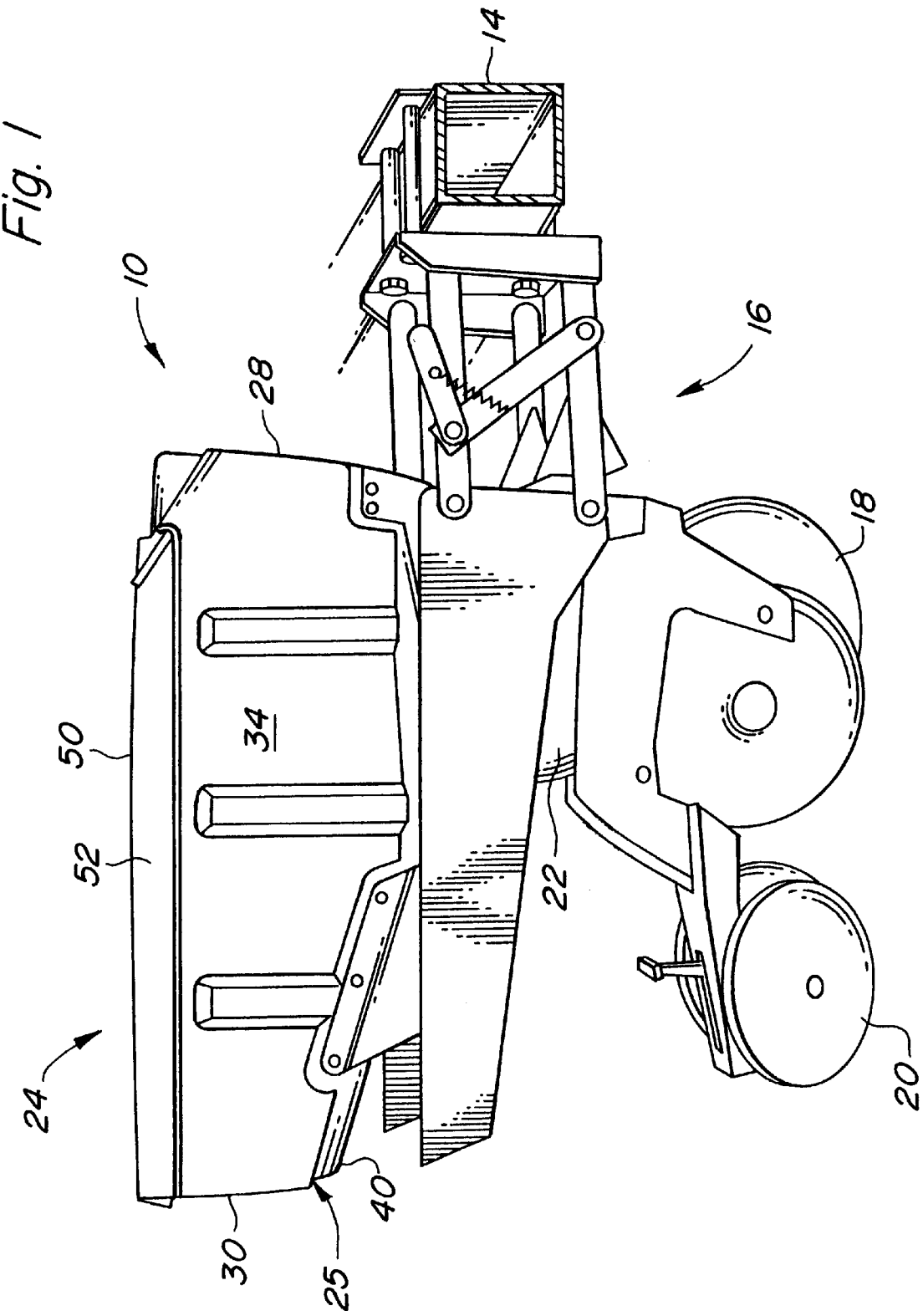
FIG. 1 is a side view of the a row crop planter row unit with the hopper of the present invention with its lid in its closed position.
Figure 2:
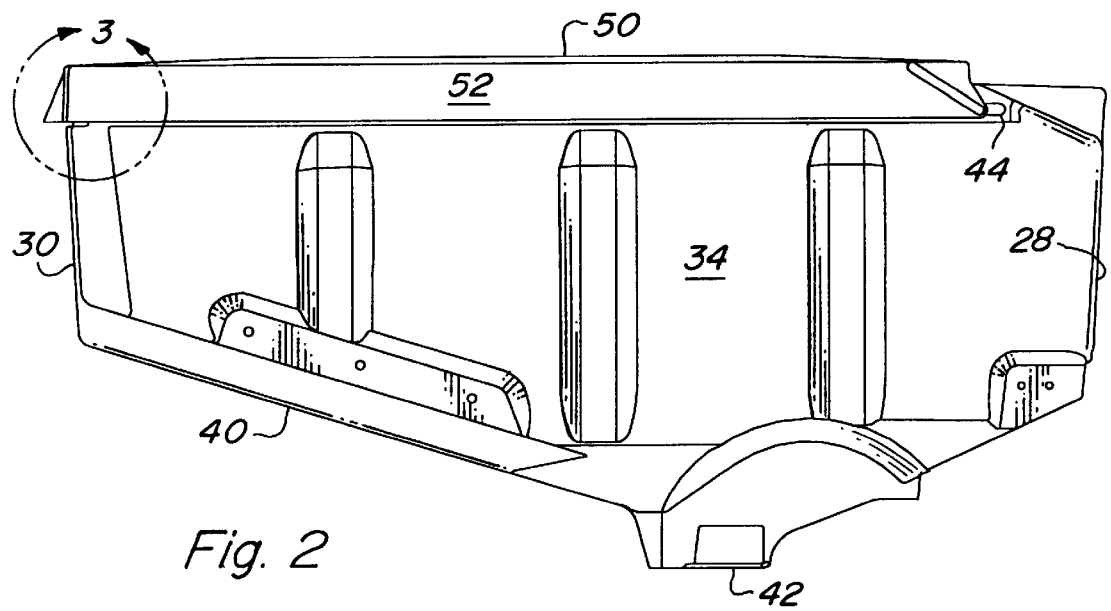
FIG. 2 is a side view of the hopper of the present invention.
Figure 3:
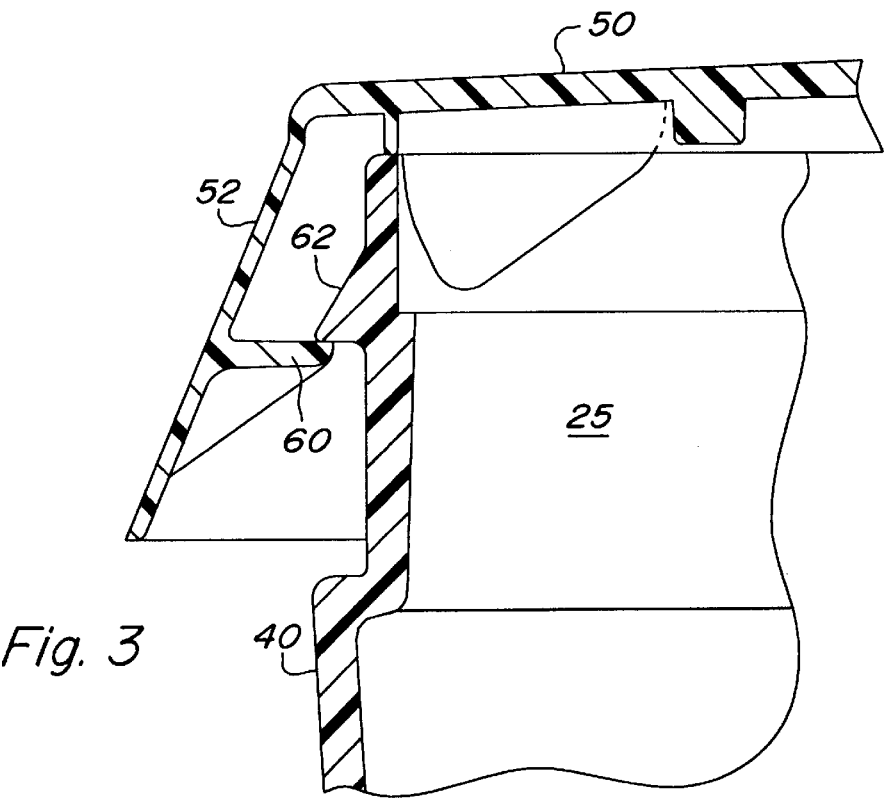
FIG. 3 is a detail view of the latch assembly identified in FIG. 2.

FIG. 1 illustrates a row crop planting unit 10 having a frame 12 that is attached to a toolbar 14 by parallel linkage 16. The frame 12 is provided with a furrow opener 18 for forming a seed trench and closing wheels 20 for closing the seed trench formed by the furrow opener 18. Immediately above the furrow opener 18 is a seed meter 22 for dispensing a measured amount of seed to the seed trench. Seed hopper 24 is located above the seed meter 22 and provides a reservoir of seed to be fed into the seed meter.

Figure 5:
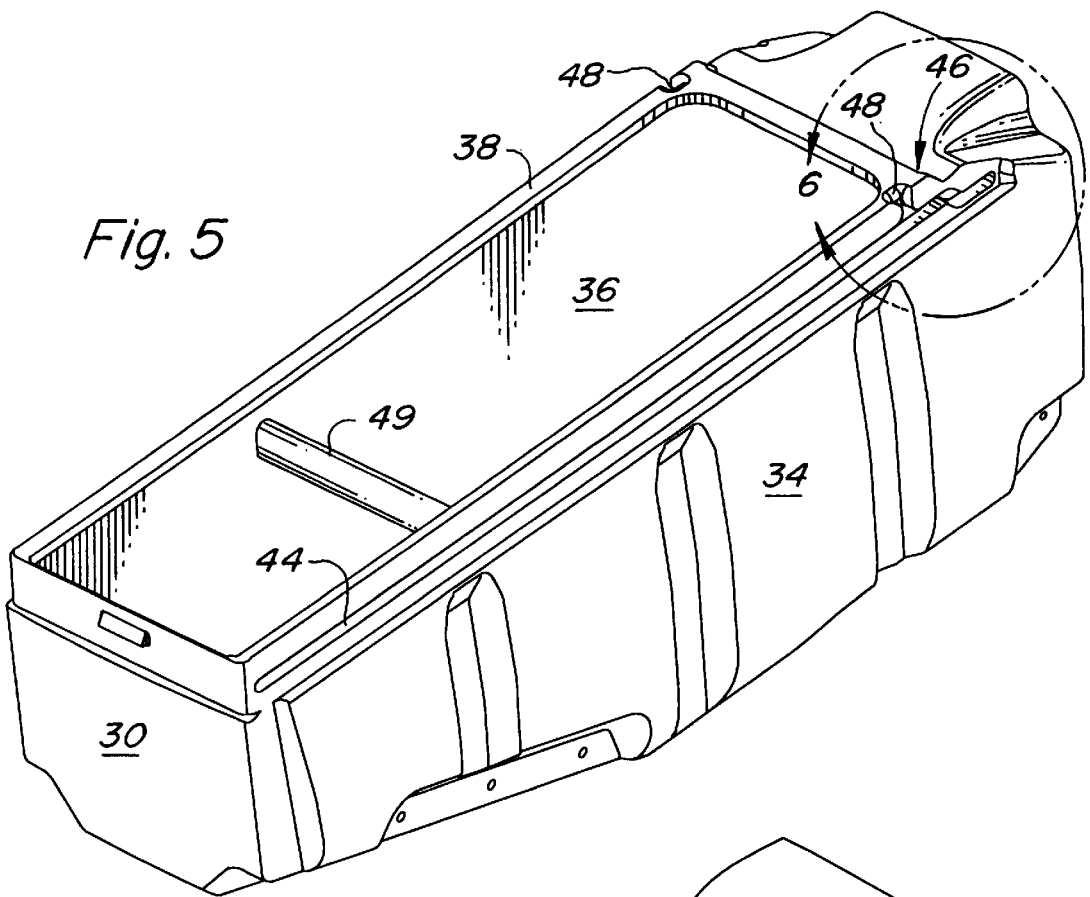
FIG. 5 is a perspective view of the open bin of the hopper
Figure 6:
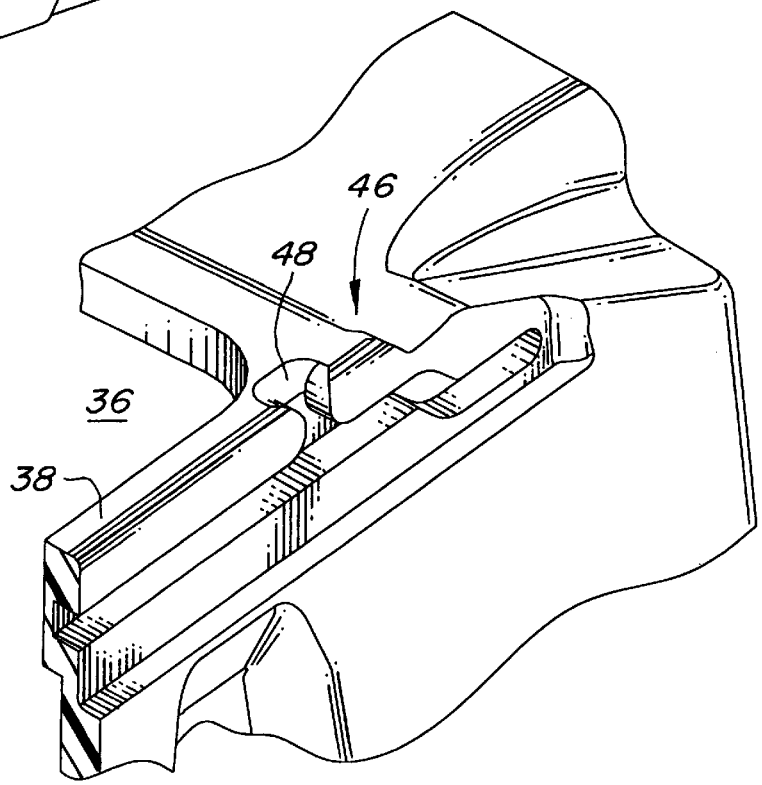
FIG. 6 is a detail view of the front portion of the track identified in FIG. 5.

The seed hopper 24 comprises a plastic bin 25 having front and rear walls 28 and 30 respectively, that are joined together by left and right side walls 32 and 34. The bin is provided with a horizontal open top 36 defining a top edge 38. The bottom of the bin is enclosed by a bottom wall 40 having an outlet opening 42 that communicates with the seed meter 22. The top edge is provided with a track 44 extending on the side walls 32 and 34 between the front and right rear walls 28 and 30. The track 44 comprises a channel formed in the plastic sidewalls. As illustrated in FIGS. 5 and 6, the track 44 has a forward portion 46 adjacent to the front wall 28 that is depressed relative to the remaining track. In addition the track is provided with a vertical opening 48. The bin is roto molded and provided with a stiffing member 49 that also acts as a handle when removing the bin from the frame.

Figure 4:
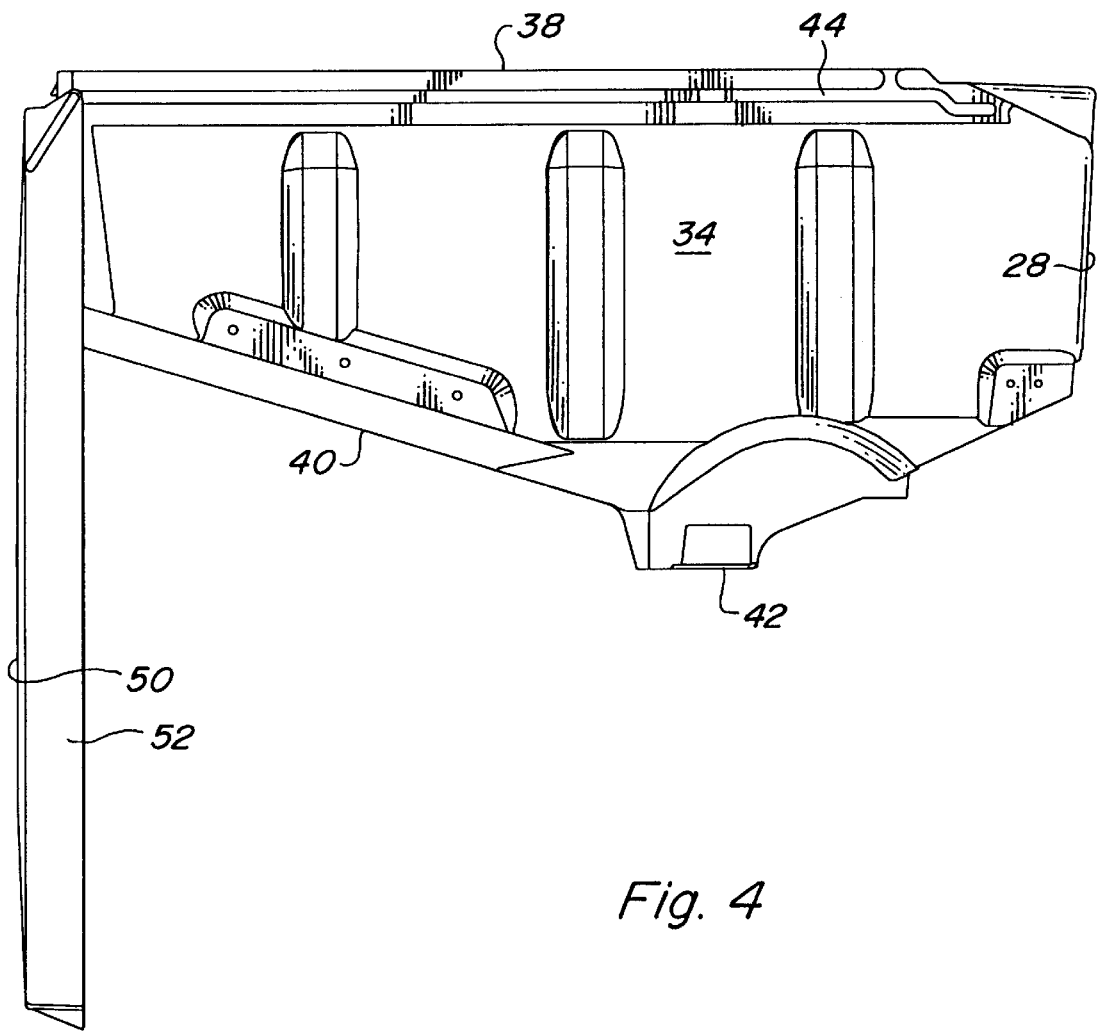
FIG. 4 is an exploded view of the hopper with the lid in its open holding position.

The seed hopper 24 is also provided with a lid 50 having an overlapping rim 52. The front portion of the overlapping rim 52 is provided with two inwardly projecting pins 54 that ride in track 44. The lid is mounted to the bin by lowering the pins 54 through openings 48 so the pins are free to slide in track 44. As the lid slides rearwardly on the bin the pins move rearwardly in the tracks 44. At the end of the track the lid is free to pivot 90 degrees into a vertical holding position as illustrated in FIG. 4. The lid is located below the top edge of the bin. As with the bin, the lid can also be made of plastic.

The bin and lid are provided with cooperating latching structures located at the rear of the bin and lid. The lid is provided with a hook 60 that engages catch 62 located on the bin. When the lid is fully closed by sliding the lid forward on the bin the hook 60 engages catch 62. When releasing the latching structures the farmer grabs the rear outwardly extending rim and twists the overlapping rim upwardly away from the catch 62. Both latching assemblies are molded into the bin and lid.

When closing the hopper, the lid slides forwardly along the track and then moves downwardly as the track depresses, so that the overlapping rim fits downwardly over the top edge. The latching structures engage to maintain this downward closed position of the lid.

The invention should not be limited by the above described embodiment, but should be limited solely by the claims that follow.

I claim:

1. A hopper for a seeding machine, the hopper comprising:
   a bin having a front wall, a rear wall, and left and right side walls, the bin further having a substantially horizontal open top having a top edge, the side walls are provided with a track extending between the front wall and the rear wall;
   a lid for covering the substantially horizontal open top is provided with two inwardly extending pins that engage the track, the lid has a forward closed position and a rear fully opened position, in moving the lid from a forward closed position to a rear fully opened position the pins slide along the track, the track has a forward portion that is depressed so that the lid tracks downwardly as it slides forward from an opened position to its forward closed position, at the rear fully opened position the lid can be pivoted on the pins so that it assumes a vertical holding position when the lid is pivoted vertically the lid is located below the top edge of the bin;
   the hopper and bin are provided with cooperating latching structures for latching the lid in its forward closed position.

2. A hopper as defined by claim 1 wherein the track is located below the top edge.

3. A hopper as defined by claim 2 wherein the track is provided with an opening by which the pins can be disengaged from the track and the lid removed from the bin.

4. A hopper as defined by claim 3 wherein the lid is provided with an overlapping rim that overlies the top edge and extends downwardly therefrom outside the bin.

5. A hopper as defined by claim 4 wherein the bin and lid are made of plastic.

6. A hopper as defined by claim 5 wherein the bin is provided with a bottom extending between the front wall, rear wall and side walls, the bottom is provided with an outlet opening for dispensing product located in the bin.

7. A hopper as defined by claim 6 wherein the cooperating latching structure on the lid comprises a hook and the cooperating latching structure on the bin comprises a catch.

8. A row crop planting unit, the planting unit comprising:
   a frame;
   a furrow opener mounted to the frame for forming a seed trench;
   a seed meter mounted to the frame above the furrow opener for providing a measured amount of seed to the seed trench;
   a seed hopper mounted to the frame above the seed meter for supplying seed to the seed meter, the seed hopper is provided with a bin having a front wall, a rear wall and left and right side walls, the bin further having an open top having a top edge, the side walls are provided with a track extending between the front wall and the rear wall, a lid for covering the substantially horizontal open top is provided with two inwardly extending pins that engage the track, the lid has a forward closed position and a rear fully opened position, in moving the lid from a forward closed position to a rear fully opened position the pins slide along the track, at the rear fully opened position the lid can be pivoted on the pins so that it assumes a vertical holding position.

9. A row crop planting unit as defined by claim 8 wherein the hopper and bin are provided with cooperating latching structures for latching the lid in its forward closed position.

10. A row crop planting unit as defined by claim 9 wherein the track has a forward portion that is depressed so that the lid tracks downwardly as it slides forward from an opened position to its forward closed position.

11. A row crop planting unit as defined by claim 10 wherein when the lid is pivoted vertically the lid is located below the top edge of the bin.

12. A row crop planting unit as defined by claim 11 wherein the track is located below the top edge.

13. A row crop planting unit as defined by claim 12 wherein the track is provided with an opening by which the pins can be disengaged from the track and the lid removed from the bin.

14. A row crop planting unit as defined by claim 13 wherein the lid is provided with an overlapping rim that overlies the top edge and extends downwardly therefrom outside the bin.

15. A row crop planting unit as defined by claim 14 wherein the bin and lid are mode of plastic.

16. A row crop planting unit as defined by claim 15 wherein the cooperating latching structure on the lid comprises a hook and the cooperating latching structure on the bin comprises a catch.

17. A row crop planting unit as defined by claim 16 wherein the lid has a front portion and the pins are located on the front portion of the lid.

* * * * *